US012629736B2

(12) United States Patent
Yanagawa et al.

(10) Patent No.: US 12,629,736 B2
(45) Date of Patent: May 19, 2026

(54) METHOD OF MANUFACTURING A BRAZING SHEET

(71) Applicant: UACJ Corporation, Tokyo (JP)

(72) Inventors: Yutaka Yanagawa, Aichi (JP); Taichi Suzuki, Aichi (JP); Tomoki Yamayoshi, Aichi (JP); Tatsuya Ide, Aichi (JP)

(73) Assignee: UACJ Corporation, Tokyo (JP)

( * ) Notice: Subject to any disclaimer, the term of this patent is extended or adjusted under 35 U.S.C. 154(b) by 76 days.

(21) Appl. No.: 18/024,987

(22) PCT Filed: Sep. 22, 2021

(86) PCT No.: PCT/JP2021/034735
§ 371 (c)(1),
(2) Date: Mar. 7, 2023

(87) PCT Pub. No.: WO2022/065347
PCT Pub. Date: Mar. 31, 2022

(65) Prior Publication Data
US 2025/0083205 A1    Mar. 13, 2025

(30) Foreign Application Priority Data

Sep. 25, 2020    (JP) ................................. 2020-160434

(51) Int. Cl.
*B21B 1/22*      (2006.01)
*B23K 35/02*    (2006.01)
*B23K 35/28*    (2006.01)

(52) U.S. Cl.
CPC .......... *B21B 1/222* (2013.01); *B23K 35/0238* (2013.01); *B23K 35/286* (2013.01); *B21B 2001/221* (2013.01); *B21B 2001/225* (2013.01)

(58) Field of Classification Search
CPC .............. B21B 1/222; B21B 2001/221; B21B 2001/225; B23K 35/0238; B23K 35/286;
(Continued)

(56) References Cited

U.S. PATENT DOCUMENTS 5,171,377 A    12/1992   Shimizu et al.
6,113,667 A     9/2000   Hyogo et al.
(Continued)

FOREIGN PATENT DOCUMENTS

CN      101641454 A    2/2010
CN      105829558 A    8/2016
(Continued)

OTHER PUBLICATIONS

English translation of the International Search Report mailed Dec. 7, 2021 in parent application No. PCT/JP2021/034735.
(Continued)

*Primary Examiner* — John A Hevey
(74) *Attorney, Agent, or Firm* — J-TEK LAW PLLC; Jeffrey D. Tekanic; Scott T. Wakeman

(57) ABSTRACT

A method of manufacturing a brazing sheet includes layering at least a core-material slab composed of an aluminum material and a filler-material slab composed of an Al—Si series alloy to prepare a clad slab. At least one aluminum slab in the clad slab, which is disposed in a range from the core-material slab to the filler-material slab inclusive, contains a metal element that oxidizes more readily than Al. The clad slab is hot rolled to prepare a clad sheet that includes a core material composed of the core-material slab and a filler material composed of the filler-material slab. Then, one or more passes of cold rolling is performed on the clad sheet. Between passes of cold rolling or after completion of the cold rolling, at least one surface of the clad sheet is etched
(Continued)

using an alkaline etching solution having a sodium hydroxide concentration of 0.05-1.0 mass %.

21 Claims, 1 Drawing Sheet

(58) Field of Classification Search
CPC ..... B23K 35/383; B32B 15/016; C22C 21/02; C22C 21/00
See application file for complete search history.

(56) References Cited

U.S. PATENT DOCUMENTS

| | | | |
|---|---|---|---|
| 6,341,651 | B1 | 1/2002 | Ohta |
| 6,528,468 | B2 | 3/2003 | Matsukawa et al. |
| 6,896,977 | B2 | 5/2005 | Nishimura et al. |
| 7,018,722 | B2 | 3/2006 | Toyama et al. |
| 7,107,680 | B2 | 9/2006 | Ueda |
| 7,337,941 | B2 | 3/2008 | Kilmer et al. |
| 7,926,701 | B2 | 4/2011 | Dulac et al. |
| 8,043,711 | B2 | 10/2011 | Koshigoe et al. |
| 8,247,083 | B2 | 8/2012 | Izumi et al. |
| 8,413,876 | B2 | 4/2013 | Dulac et al. |
| 9,138,833 | B2 | 9/2015 | Koshigoe et al. |
| 9,744,610 | B2 | 8/2017 | Terada et al. |
| 10,661,395 | B2 | 5/2020 | Ichikawa et al. |
| 10,737,357 | B2 | 8/2020 | Itoh et al. |
| 10,773,325 | B2 | 9/2020 | Eckhard et al. |
| 11,007,609 | B2 | 5/2021 | Itoh et al. |
| 11,225,051 | B2 | 1/2022 | Jacoby et al. |
| 11,571,769 | B2 | 2/2023 | Yanagawa et al. |
| 2001/0018965 | A1 | 9/2001 | Matsukawa et al. |
| 2001/0040180 | A1 | 11/2001 | Wittebrood et al. |
| 2002/0005230 | A1 | 1/2002 | Watsuji et al. |
| 2002/0012811 | A1 | 1/2002 | Wittebrood et al. |
| 2002/0037425 | A1 | 3/2002 | Mooij et al. |
| 2002/0086179 | A1* | 7/2002 | Wittebrood ........... B32B 15/017 428/654 |
| 2002/0102431 | A1 | 8/2002 | Wittebrood et al. |
| 2003/0084569 | A1 | 5/2003 | Hyogo et al. |
| 2004/0009358 | A1 | 1/2004 | Scott et al. |
| 2004/0028940 | A1 | 2/2004 | Toyama et al. |
| 2004/0238605 | A1 | 12/2004 | Nishimura et al. |
| 2005/0006065 | A1 | 1/2005 | Katsumata et al. |
| 2005/0034848 | A1 | 2/2005 | Ueda |
| 2005/0189047 | A1 | 9/2005 | Hasegawa et al. |
| 2006/0000586 | A1 | 1/2006 | Katsumata et al. |
| 2006/0102691 | A1 | 5/2006 | Toyama et al. |
| 2006/0243778 | A1 | 11/2006 | Yamaguchi et al. |
| 2007/0017605 | A1 | 1/2007 | Nakamura et al. |
| 2007/0158386 | A1 | 7/2007 | Dulac et al. |
| 2008/0003451 | A1 | 1/2008 | Suzuki et al. |
| 2009/0165901 | A1 | 7/2009 | Koshigoe et al. |
| 2010/0101688 | A1 | 4/2010 | Koshigoe et al. |
| 2010/0147500 | A1* | 6/2010 | Minami .................... C22F 1/04 148/528 |
| 2010/0266871 | A1 | 10/2010 | Matsuo et al. |
| 2011/0114228 | A1 | 5/2011 | Nakamura et al. |
| 2011/0198392 | A1 | 8/2011 | Wittebrood |
| 2011/0240280 | A1 | 10/2011 | Izumi et al. |
| 2011/0287276 | A1 | 11/2011 | Izumi et al. |
| 2012/0145365 | A1 | 6/2012 | Yamashita et al. |
| 2013/0118013 | A1 | 5/2013 | Yamashita et al. |
| 2014/0315042 | A1* | 10/2014 | Suzuki ............... B23K 35/0233 228/205 |

| | | | |
|---|---|---|---|
| 2014/0322558 | A1 | 10/2014 | Takeda et al. |
| 2014/0329109 | A1 | 11/2014 | Takewaka et al. |
| 2015/0000783 | A1 | 1/2015 | Terada et al. |
| 2015/0037607 | A1* | 2/2015 | Itoh ......................... C22C 21/00 428/654 |
| 2015/0053751 | A1 | 2/2015 | Eckhard et al. |
| 2015/0068713 | A1 | 3/2015 | Sucke et al. |
| 2015/0118517 | A1 | 4/2015 | Itoh et al. |
| 2015/0165564 | A1 | 6/2015 | Ahl et al. |
| 2015/0239071 | A1 | 8/2015 | Kiga |
| 2015/0321293 | A9 | 11/2015 | Itoh et al. |
| 2016/0325367 | A1 | 11/2016 | Eckhard et al. |
| 2016/0332209 | A1 | 11/2016 | Yamashita et al. |
| 2017/0113305 | A1 | 4/2017 | Ando et al. |
| 2017/0151637 | A1 | 6/2017 | Ichikawa et al. |
| 2017/0151638 | A1 | 6/2017 | Itoh et al. |
| 2017/0282271 | A1 | 10/2017 | Itoh et al. |
| 2018/0133845 | A1 | 5/2018 | Itoh et al. |
| 2018/0141166 | A1 | 5/2018 | Itoh et al. |
| 2018/0169797 | A1 | 6/2018 | Izumi et al. |
| 2018/0214964 | A1 | 8/2018 | Itoh et al. |
| 2018/0282843 | A1 | 10/2018 | Hasegawa et al. |
| 2019/0077119 | A1 | 3/2019 | Jacoby et al. |
| 2019/0151973 | A1 | 5/2019 | Itoh et al. |
| 2019/0291218 | A1 | 9/2019 | Itoh et al. |
| 2019/0314916 | A1 | 10/2019 | Itoh et al. |
| 2019/0337074 | A1 | 11/2019 | Miyake |
| 2020/0061758 | A1 | 2/2020 | Itoh et al. |
| 2020/0338671 | A1 | 10/2020 | Itoh |
| 2021/0170532 | A1* | 6/2021 | Chehab ................. F28F 21/089 |
| 2021/0213568 | A1 | 7/2021 | Yanagawa et al. |

FOREIGN PATENT DOCUMENTS

| | | |
|---|---|---|
| JP | H04100696 A | 4/1992 |
| JP | H10180489 A | 7/1998 |
| JP | 2000225461 A | 8/2000 |
| JP | 2001105174 A | 4/2001 |
| JP | 2001158983 | 6/2001 |
| JP | 5456920 B1 | 4/2014 |
| JP | 2014155955 A | 8/2014 |
| JP | 2015526290 A | 9/2015 |
| JP | 2016112591 A | 6/2016 |
| JP | 2017505231 A | 2/2017 |
| WO | 2017208940 A1 | 12/2017 |
| WO | 2018100793 A1 | 6/2018 |
| WO | 2020054564 A1 | 3/2020 |

OTHER PUBLICATIONS

English translation of the Written Opinion of the International Searching Authority in parent application No. PCT/JP2021/034735.
Office Action from the Japanese Patent Office dispatched Aug. 27, 2024, in related Japanese application No. 2020-160434, and machine translation thereof.
Office Action from the Chinese Patent Office dispatched May 27, 2025, in counterpart CN application No. 202180051626.3, and translation thereof.
Amendment and Response to Office Action mailed Apr. 2, 2025, filed on Aug. 11, 2025, in related U.S. Appl. No. 17/905,423.
Second Office Action from the Chinese Patent Office dispatched Dec. 5, 2025, in counterpart CN application No. 202180051626.3, and translation thereof.
Third Office Action from the Chinese Patent Office dispatched Apr. 8, 2026, in counterpart CN application No. 202180051626.3, and machine translation thereof.

* cited by examiner

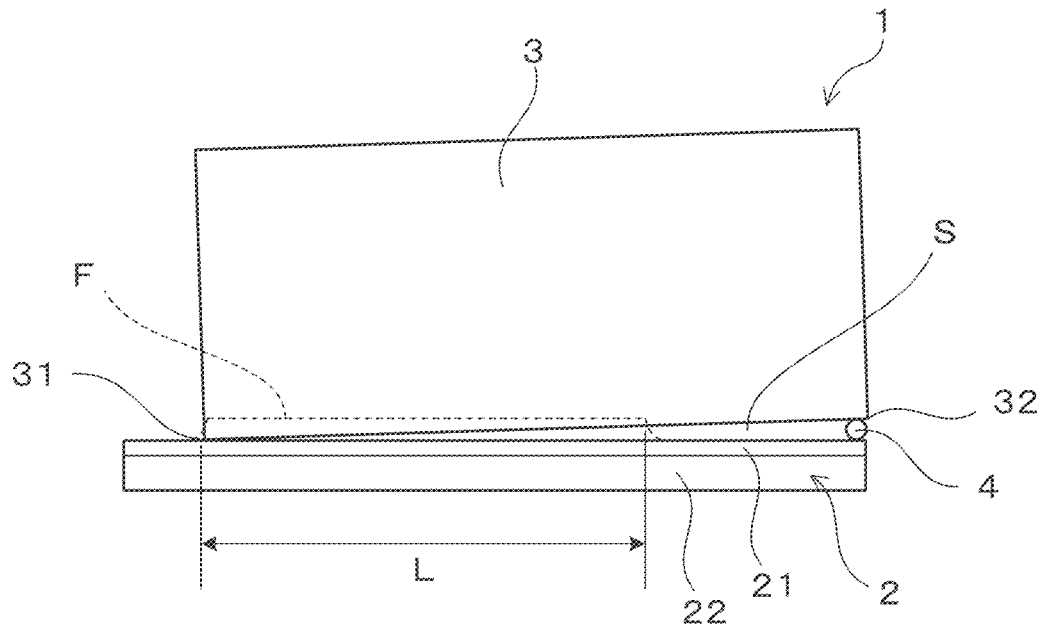

METHOD OF MANUFACTURING A BRAZING SHEET

CROSS-REFERENCE

This application is the US national stage of International Patent Application No. PCT/JP2021/034735 filed on Sep. 22, 2021, which claims priority to Japanese Patent Application No. 2020-160434 filed on Sep. 25, 2020.

TECHNICAL FIELD

The present invention relates to a method of manufacturing a brazing sheet.

BACKGROUND ART

Aluminum products, such as heat exchangers, mechanical parts, and the like, have numerous components composed of aluminum materials (which include aluminum and aluminum alloys; likewise, below). It is often the case that these components are brazed using a brazing sheet that has a core material and a filler material, which is provided on at least one surface of the core material. The core material of the brazing sheet is typically composed of an aluminum alloy whose solidus temperature is 620° C. or higher. In addition, the filler material is composed of an Al—Si (aluminum-silicon) alloy whose solidus temperature is approximately 577° C.

A flux-brazing method is often used as a method of brazing an aluminum material, in which brazing is performed after applying a flux, in advance, to the surfaces of portions to be joined, i.e., the surfaces of portions that are to be joined by brazing. However, in the situation in which brazing is performed using flux-brazing methods, after the brazing has been completed, flux and the residue thereof adhere to the surface of the aluminum product. The flux, the residue thereof, or the like may cause problems depending on the intended use of the aluminum product. Furthermore, to remove the flux, the residue thereof, and the like, it is necessary to perform an acid-washing process, and the cost of such a process has been viewed as a problem in recent years.

To avoid the above-described problems attendant with the use of flux, depending on the intended usage of the aluminum product, so-called vacuum-brazing methods are also used, in which brazing is performed in a vacuum without the application of flux to the surfaces of the portion to be joined. However, vacuum-brazing methods have the problems in that productivity is lower than in flux-brazing methods and the quality of the brazed joint(s) tends to deteriorate. In addition, the equipment cost, the maintenance cost, and the like are higher in brazing furnaces used in vacuum-brazing methods than in standard brazing furnaces.

Accordingly, so-called flux-free-brazing methods, in which brazing is performed in an inert-gas atmosphere without applying flux to the surfaces of the portions to be joined, have been proposed. The core material and the filler material of the brazing sheet used in the flux-free-brazing methods contain metal elements, such as Mg (magnesium), that oxidize more readily than Al (aluminum) does. These metal elements act to break down oxide films present on the surface of the brazing sheet and on the surface of the opposing material to be joined with the brazing sheet during brazing. In flux-free brazing, brazing is performed utilizing the effects of these metal elements.

In addition, in Patent Document 1, a method of manufacturing a brazing sheet for vacuum brazing is proposed wherein, in the manufacture of a brazing sheet, which is made of aluminum that has been cladded using an Al—Si—Mg (aluminum—silicon—magnesium) alloy as the filler material, the surface thereof is etched by 0.02-5 g/m² using an alkaline solution and, subsequently, a neutralizing process is performed thereon.

PRIOR ART LITERATURE

Patent Documents

Patent Document 1
Japanese Laid-open Patent Publication H4-100696

SUMMARY OF THE INVENTION

However, in the situation in which brazing is performed by the flux-free-brazing method using the brazing sheet obtained by the manufacturing method described in Patent Document 1, there is a problem in that brazing defects tend to occur.

It is one non-limiting object of the present teachings to provide a brazing-sheet manufacturing method in which a brazing sheet that excels in brazeability in flux-free brazing can be obtained.

In one aspect of the present teachings, a method of manufacturing a brazing sheet for performing brazing of an aluminum material in an inert-gas atmosphere without using flux may comprise:

a layering process wherein a plurality of aluminum slabs are layered, the aluminum slabs including a core-material slab composed of an aluminum material and a filler-material slab composed of an Al—Si series alloy and disposed on at least one surface of the core-material slab, and wherein a clad slab is prepared in which at least one aluminum slab, from among the plurality of the aluminum slabs, disposed in the span from the core-material slab to the filler-material slab inclusive contains a metal element that oxidizes more readily than Al;

a hot-rolling process wherein hot rolling is performed on the clad slab and a clad sheet is prepared that comprises a core material, which is composed of the core-material slab, and a filler material, which is composed of the filler-material slab and disposed on at least one surface of the core-material slab;

a cold-rolling process wherein one or more passes of cold rolling is performed on the clad sheet; and an etching process wherein, between passes of cold rolling in the cold-rolling process or after completion of the cold-rolling process, the surface of the clad sheet is etched using an alkaline etching solution in which the NaOH concentration is 0.05 mass % or more and 1.0 mass % or less.

In the method of manufacturing the brazing sheet, a clad sheet is prepared by performing hot rolling and cold rolling on the above-mentioned clad slab. The filler material, which is composed of an Al—Si series alloy, is disposed on at least one surface of this clad sheet. By etching the surface of that clad sheet using the above-mentioned specific alkaline etching solution, sturdy oxide films that have formed on the surface of the clad sheet in the manufacturing process can be removed. Consequently, a portion having an oxide film that is thinner and more brittle than the oxide film formed in the manufacturing process of the brazing sheet is present on the surface of the brazing sheet obtained using the above-mentioned manufacturing method.

In addition, with regard to the brazing sheet obtained using the above-mentioned manufacturing method, at least one layer, from among the plurality of layers constituting the brazing sheet, in the span from the core material to the filler material inclusive contains a metal element that oxidizes more readily than Al. Consequently, during brazing, the brittle portion of the oxide film in the brazing sheet is easily made brittle and broken down by the above-mentioned metal element, and thereby brazing can be performed without using flux. For this reason, according to the brazing sheet obtained using the above-mentioned manufacturing method, brazeability in flux-free brazing can be improved.

As described above, according to the above-mentioned aspects, a method of manufacturing a brazing sheet can be provided in which a brazing sheet that excels in brazeability in flux-free brazing can be obtained.

BRIEF DESCRIPTION OF THE DRAWINGS

The sole Figure is a side view of a test specimen used in a gap-filling test according to a working example.

DETAILED DESCRIPTION

<Layering Process>

In the above-mentioned method of manufacturing a brazing sheet, first, a core-material slab, which will ultimately become the core material of a brazing sheet, and a plurality of aluminum slabs, each aluminum slab including a brazing-material slab that will ultimately become the filler material of the brazing sheet, are prepared. Furthermore, a layering process, in which these aluminum slabs are overlaid in a desired order to prepare a clad slab, is performed. The layering order, the number of layers, and the like of the aluminum slabs in the clad slab should be set as appropriate in accordance with the layered structure, the number of layers, and the like of the desired brazing sheet.

For example, in the situation in which the aim is to obtain a brazing sheet having a two-layer structure and comprising a core material and a filler material that is layered on one surface of the core material, the clad slab should comprise two aluminum slabs: a core-material slab and a filler-material slab that is layered on one surface of the core-material slab. Likewise, in the situation in which the aim is to obtain a brazing sheet having a three-layer structure and comprising a core material and filler materials layered on both surfaces of the core material, the clad slab should comprise three aluminum slabs: a core-material slab and filler-material slabs layered on both surfaces of the core-material slab.

In addition, when the aluminum slab is to be prepared, by preparing an aluminum slab having a chemical composition that differs from that of the core-material slab and the filler-material slab and overlaying that aluminum slab with the core-material slab and the filler-material slab to make the clad slab, a brazing sheet having a layer that differs from the core material and the filler material can also be obtained. For example, when preparing the aluminum slab, by preparing an intermediate-material slab having a chemical composition that differs from that of the core-material slab and from that of the filler-material slab and manufacturing the clad slab by overlaying, in order, the core-material slab, the intermediate-material slab, and the filler-material slab, a brazing sheet, in which an intermediate material composed of the intermediate-material slab is ultimately provided between the core material and the filler material, can be obtained. In addition, when preparing the aluminum slab, by preparing a skin-material slab having a chemical composition that differs from that of the core-material slab and preparing a clad slab by overlaying, in order, the skin-material slab, the core-material slab, and the filler-material slab, a brazing sheet, in which a filler material is ultimately layered on one surface of the core material and a skin material composed of the skin-material slab is ultimately layered on the other surface, can be obtained.

At least one aluminum slab, from among the plurality of aluminum slabs that constitute the above-mentioned clad slab, disposed in the span from the core-material slab to the filler-material slab inclusive contains a metal element that oxidizes more readily than Al (aluminum). For example, Mg (magnesium), Li (lithium), Ca (calcium), and the like are examples of metal elements that oxidize more readily than Al. Among these metal elements, oxide films present on the surface of the brazing sheet or the opposing material can be broken down during brazing. For this reason, according to the brazing sheet obtained by the above-mentioned manufacturing method, flux-free brazing can be performed.

The metal element described above, for example, may be contained in the core-material slab or may be contained in the filler-material slab. In addition, the metal element described above may be contained in both the core-material slab and the filler-material slab. In the situation in which the intermediate-material slab is disposed between the core-material slab and the filler-material slab, the metal element described above can also be added to the intermediate-material slab. By performing hot rolling and cold rolling on the clad slab configured in this manner, at least one layer in the span from the core material to the filler material inclusive contains a metal element that oxidizes more readily than Al, and thereby a brazing sheet that is applicable to flux-free brazing can be obtained.

From the viewpoint of further improving brazeability in flux-free brazing, the clad slab preferably contains, as the metal element that oxidizes more readily than Al, at least one from among Mg and Li and more preferably contains Mg. In addition, from the same viewpoint, at least one from among the filler-material slab and the aluminum slab adjacent to the filler-material slab preferably contains the metal element that oxidizes more readily than Al.

A more detailed composition of every aluminum slab included in the clad slab is explained below.
(Core-Material Slab)

The core-material slab is the aluminum slab that, after hot rolling and cold rolling have been performed on the clad slab, will become the core material of the brazing sheet. An aluminum material having a solidus temperature higher than the Al—Si series alloy that constitutes the filler-material slab can be used as the aluminum material that constitutes the core-material slab. The core-material slab may comprise, for example, a JIS A1000-series aluminum, an A3000-series alloy, an A5000-series alloy, or an A6000-series alloy.

More specifically, the aluminum material that constitutes the core-material slab may have a chemical composition composed of Al and unavoidable impurities. In addition, the aluminum material that constitutes the core-material slab may contain, in addition to Al and unavoidable impurities, one or two or more alloying elements selected from the group consisting of Fe (iron), Si (silicon), Mg (magnesium), Cu (copper), Mn (manganese), Zn (zinc), Cr (chrome), Ti (titanium), Zr (zirconium), Sn (tin), and In (indium).

In the situation in which the aim is to obtain a brazing sheet in which the core material contains a metal element that oxidizes more readily than Al, the core-material slab may be composed of an aluminum material that contains Mg: greater than 0 mass % and 3.0 mass % or less. It is noted that the chemical composition of the core material in the brazing sheet is identical to the chemical composition of the core-material slab. The content ranges of the alloying elements that can be contained in the core-material slab, and the reasons for restrictions thereof, are explained below.

Fe: 0 Mass % or More and 1.5 Mass % or Less

The aluminum material that constitutes the core-material slab may contain 1.5 mass % or less of Fe as an optional component. In an embodiment of the present teachings in which the core-material slab contains greater than 0 mass % and 1.5 mass % or less of Fe, a brazing sheet comprising a core material that contains Fe can be obtained. In such an embodiment, Fe in the core material acts to increase the strength of the core material.

However, if the Fe content in the core material becomes excessive, there is a risk that it will lead to degradation in the corrosion resistance of the core material. In addition, in this situation, there is a risk that very large precipitates will tend to form in the core material, which will lead to a decrease in the ductility of the brazing sheet. By preparing a brazing sheet using a core-material slab that contains Fe: greater than 0 mass % and 1.5 mass % or less, the strength of the core material can be further increased while avoiding these problems.

Si: 0 Mass % or More and 1.5 Mass % or Less

The aluminum material that constitutes the core-material slab may contain 1.5 mass % or less of Si as an optional component. In the situation in which the core-material slab contains greater than 0 mass % and 1.5 mass % or less of Si, a brazing sheet comprising a core material that contains Si can be obtained. Si in the core material acts to increase the strength of the core material.

However, if the Si content in the core material becomes excessive, there is a risk that the melting point of the core material will decrease, which will lead to degradation in brazeability. By preparing a brazing sheet using a core-material slab that contains Si: greater than 0 mass % and 1.5 mass % or less, the strength of the core material can be further increased while avoiding degradation in brazeability.

Mg: 0 Mass % or More and 3.0 Mass % or Less

The aluminum material that constitutes the core-material slab may contain 3.0 mass % or less of Mg as an optional component. In the situation in which the core-material slab contains greater than 0 mass % and 3.0 mass % or less of Mg, a brazing sheet comprising a core material that contains Mg can be obtained. Mg in the core material diffuses owing to heating during brazing and moves into the filler material. Then, owing to the Mg that has moved into the filler material breaking down the oxide films present on the surface of the brazing sheet and on the surface of the opposing material, flux-free brazing can be performed.

From the viewpoint of further improving brazeability in flux-free brazing, the Mg content in the core-material slab is preferably set to 0.10 mass % or more and more preferably set to 0.20 mass % or more. In this situation, the amount of Mg that moves from the core material into the filler material owing to heating during brazing can be made larger.

On the other hand, if the Mg content in the core-material slab becomes excessive, then the amount of Mg that reaches the surface of the brazing sheet during brazing will tend to become large. Then, if the Mg that reaches the surface of the brazing sheet oxidizes during brazing, then there is a risk that it will lead to degradation in brazeability. By setting the Mg content in the core-material slab to 3.0 mass % or less and preferably to 1.5 mass % or less, the amount of Mg oxides formed during brazing is further reduced and, in turn, degradation in brazeability can be avoided.

Cu: 0 Mass % or More and 2.0 Mass % or Less

The aluminum material that constitutes the core-material slab may contain 2.0 mass % or less of Cu as an optional component. In the situation in which the core-material slab contains greater than 0 mass % and 2.0 mass % or less of Cu, a brazing sheet comprising a core material that contains Cu can be obtained. Cu in the core material acts to increase the strength of the core material. In addition, Cu acts to adjust the electric potential of the core material, thereby improving corrosion resistance.

However, if the Cu content in the core material becomes excessive, intergranular corrosion will tend to occur. In addition, in this situation, there is a risk that the melting point of the core material will decrease, which will lead to degradation in brazeability. By preparing a brazing sheet using a core-material slab that contains Cu: greater than 0 mass % and 2.0 mass % or less, the strength and the corrosion resistance of the core material can be further increased while avoiding these problems.

Mn: 0 Mass % or More and 2.0 Mass % or Less

The aluminum material that constitutes the core-material slab may contain 2.0 mass % or less of Mn as an optional component. In the situation in which the core-material slab contains greater than 0 mass % and 2.0 mass % or less of Mn, a brazing sheet comprising a core material that contains Mn can be obtained. Mn in the core material acts to increase the strength of the core material. In addition, Mn acts to adjust the electric potential of the core material, thereby improving corrosion resistance.

However, if the Mn content in the core-material slab becomes excessive, then cracks will tend to occur in the core material in the process of manufacturing the brazing sheet. By preparing a brazing sheet using the core-material slab that contains Mn: greater than 0 mass % and 2.0 mass % or less, the strength and the corrosion resistance of the core material can be further increased while avoiding degradation in the manufacturability of the brazing sheet.

Zn: 0 Mass % or More and 6.5 Mass % or Less, Sn: 0 Mass % or More and 0.10 Mass % or Less, and in: 0 Mass % or More and 0.10 Mass % or Less The aluminum material that constitutes the core-material slab may contain one or two or more elements from among 6.5 mass % or less of Zn, 0.10 mass % or less of Sn, and 0.10 mass % or less of In as optional components. In the situation in which the core-material slab contains one or two or more elements from among Zn: greater than 0 mass % and 6.5 mass % or less, Sn: greater than 0 mass % and 0.10 mass % or less, and In: greater than 0 mass % and 0.10 mass % or less, a brazing sheet comprising a core material that contains these elements can be obtained.

Zn, Sn, and In in the core material act to set the natural electrode potential of the core material to a low potential. By setting the natural electrode potential of the core material to a low potential, the core material can be made to function as a sacrificial anode of the aluminum product after brazing. However, if the Zn, Sn, or In content in the core material becomes excessive, there is a risk that the natural electrode potential of the core material will decrease excessively, which will diminish the sacrificial corrosion-inhibiting effect at an early stage. By preparing a brazing sheet using a core-material slab that contains one or two or more elements from among Zn: greater than 0 mass % and 6.5 mass % or less, Sn: greater than 0 mass % and 0.10 mass % or less, and In: greater than 0 mass % and 0.10 mass % or less, the core material can be made to function as a sacrificial anode, and thereby the sacrificial corrosion-inhibiting effect due to the core material can be maintained over a longer term.

Cr: 0 Mass % or More and 0.30 Mass % or Less, Zr: 0 Mass % or More and 0.30 Mass % or Less The aluminum material that constitutes the core-material slab may contain one or two elements from among 0.30 mass % or less of Cr and 0.30 mass % or less of Zr as optional components. In the situation in which the core-material slab contains one or two elements from among Cr: greater than 0 mass % and 0.30 mass % or less and Zr: greater than 0 mass % and 0.30 mass % or less, a brazing sheet comprising a core material that contains these elements can be obtained.

Cr and Zr act to make the grain size of the core material large, thereby curtailing the occurrence of erosion. However, if the Cr or Zr content in the core-material slab becomes excessive, cracks will tend to occur in the core material in the process of manufacturing the brazing sheet. By preparing a brazing sheet using a core-material slab that contains one or two elements from among Cr: greater than 0 mass % and 0.30 mass % or less and Zr: greater than 0 mass % and 0.30 mass % or less, the occurrence of erosion can be curtailed more effectively while avoiding degradation in the manufacturability of the brazing sheet.

Ti: 0 Mass % or More and 0.30 Mass % or Less

The aluminum material that constitutes the core-material slab may contain 0.30 mass % or less of Ti as an optional component. In the situation in which the core-material slab contains greater than 0 mass % and 0.30 mass % or less of Ti, a brazing sheet comprising a core material that contains Ti can be obtained. Ti in the core material acts to cause corrosion of the core material to advance in a laminar manner, thereby curtailing the advancement of corrosion in the depth direction.

However, if the Ti content in the core-material slab becomes excessive, then there is a risk that very large precipitates will tend to form in the core-material slab, which will lead to degradation in rollability during hot rolling and cold rolling. In addition, in this situation, there is also a risk that it will lead instead to degradation in the corrosion resistance of the core material. By preparing a brazing sheet using an intermediate-material slab that contains Ti: greater than 0 mass % and 0.30 mass % or less, the advancement of corrosion in the depth direction of the core material can be curtailed more effectively while avoiding these problems.

From the viewpoint of obtaining a good balance in the functions and effects described above, the aluminum material that constitutes the core-material slab preferably has a chemical composition that contains Fe: 0.05 mass % or more and 0.50 mass % or less, Si: 0.10 mass % or more and 0.50 mass % or less, Mg: 0.10 mass % or more and 1.0 mass % or less, Cu: 0.05 mass % or more and 0.50 mass % or less, Mn: 0.50 mass % or more and 1.5 mass % or less, and Ti: 0.01 mass % or more and 0.15 mass % or less, the remainder being Al and unavoidable impurities, and more preferably has a chemical composition that contains Fe: 0.05 mass % or more and 0.30 mass % or less, Si: 0.15 mass % or more and 0.35 mass % or less, Mg: 0.30 mass % or more and 1.0 mass % or less, Cu: 0.10 mass % or more and 0.50 mass % or less, Mn: 1.0 mass % or more and 1.3 mass % or less, and Ti: 0.01 mass % or more and 0.15 mass % or less, the remainder being Al and unavoidable impurities.

In addition, in the situation in which the aim is to obtain a brazing sheet in which the core material does not contain Mg, the aluminum material that constitutes the core-material slab preferably has a chemical composition that contains Fe: 0.05 mass % or more and 0.30 mass % or less, Si: 0.15 mass % or more and 0.35 mass % or less, Cu: 0.10 mass % or more and 0.50 mass % or less, Mn: 1.0 mass % or more and 1.3 mass % or less, and Ti: 0.01 mass % or more and 0.15 mass % or less, the remainder being Al and unavoidable impurities.

(Filler-Material Slab)

The filler-material slab is the aluminum slab that becomes the filler material of the brazing sheet after hot rolling and cold rolling have been performed on the clad slab. Al—Si series alloys, which are aluminum alloys that contain Si, can be used as the aluminum material that constitutes the filler-material slab. The filler-material slab may be composed of, for example, an Al—Si series alloy that contains, for example, Si: 4.0 mass % or more and 13.0 mass % or less.

In addition, the Al—Si series alloy that constitutes the filler-material slab may contain, in addition to Si, Al and unavoidable impurities, one or two or more alloying elements selected from the group consisting of Mg, Li, Ca, and Bi (bismuth), Na (sodium), Sr (strontium), Sb (antimony), Zn, Cu, Fe, Mn, Cr, Ti, Zr, Sn, and In.

In the situation in which the aim is to obtain a brazing sheet in which the filler material contains a metal element that oxidizes more readily than Al, the filler-material slab may be composed of an Al—Si series alloy that contains Si: 4.0 mass % or more and 13.0 mass % or less and further contains one or two or more metal elements from among Mg: greater than 0 mass % and 3.0 mass % or less, Li: greater than 0 mass % and 0.30 mass % or less, Ca: greater than 0 mass % and 0.30 mass % or less. It is noted that the chemical composition of the filler material in the brazing sheet is identical to the chemical composition of the filler-material slab.

Si: 4.0 Mass % or More and 13.0 Mass % or Less

The Al—Si series alloy that constitutes the filler-material slab may contain 4.0 mass % or more and 13.0 mass % or less of Si. By setting the Si content in the filler-material slab to the above-mentioned specific range, brazeability in flux-free brazing can be further improved. In the situation in which the Si content in the filler material is less than 4.0 mass %, there is a risk that problems, such as the amount of filler being insufficient or the fluidity of the filler decreasing, will tend to occur, which will lead to degradation in brazeability. In the situation in which the Si content in the filler material is greater than 13.0 mass %, there is a risk that the amount of the core-material dissolved during brazing heating will become excessive. In addition, in this situation, coarse primary-phase Si tends to form in the filler material. Then, after melting of the filler material, there is a risk that well-shaped melt holes will tend to form, in which the coarse primary-phase Si serves as the starting points.

Mg: 0 Mass % or More and 3.0 Mass % or Less, Li: 0 Mass % or More and 0.30 Mass % or Less, Ca: 0 Mass % or More and 0.30 Mass % or Less The Al—Si series alloy that constitutes the filler-material slab preferably contains one or two or more metal elements from among 3.0 mass % or less of Mg, 0.30 mass % or less of Li, and 0.30 mass % or less of Ca as optional components. In the situation in which the filler-material slab contains one or two or more metal elements from among Mg: greater than 0 mass % and 3.0 mass % or less, Li: greater than 0 mass % and 0.30 mass % or less, and Ca: greater than 0 mass % and 0.30 mass % or less, a brazing sheet comprising a filler material that contains these metal elements can be obtained.

Because the metal elements described above oxidize more readily than Al, they act to break down oxide films present on the surface of the brazing sheet and the surface of the opposing material during brazing. Consequently, by preparing a brazing sheet using a filler-material slab that contains these metal elements, a brazing sheet that is capable of performing flux-free brazing can be obtained.

The Mg content in the filler-material slab preferably is 0.10 mass % or more and more preferably is 0.20 mass % or more. In this situation, the oxide films present on the surface of the brazing sheet and the surface of the opposing material due to the Mg in the filler material can be sufficiently broken down. As a result, brazeability in flux-free brazing can be further improved. From the same viewpoint, the Li content in the filler-material slab preferably is 0.0010 mass % or more and more preferably is 0.0040 mass % or more. In addition, the Ca content in the filler-material slab preferably is 0.0010 mass % or more and more preferably is 0.0040 mass % or more.

It is noted that, in the situation in which the Mg content in the filler-material slab is 0 mass % or more and less than 0.10 mass % and the Li content and the Ca content are both 0 mass % or more and less than 0.0010 mass %, the aluminum slab adjacent to the filler-material slab preferably is composed of an aluminum material that contains 0.20 mass % or more of Mg. Thus, even in the situation in which the filler-material slab contains the metal elements described above, and even in the situation in which the content of the metal elements described above is comparatively small, by making large the amount of content of the metal elements that oxidize more readily than the Al contained in the layer adjacent to the filler material in the brazing sheet, i.e., contained in the core material, the intermediate material, etc., the amounts of the metal elements, such as Mg, that move from the core material, etc., into the filler material can be made large. As a result, the oxide films can be sufficiently broken down during brazing.

On the other hand, if the Mg, Li, or Ca content in the filler-material slab becomes excessive, then there is a risk that oxides of these metal elements will tend to form on the surface of the brazing sheet, which will lead to degradation in brazeability. By setting the Mg content in the filler-material slab to 3.0 mass % or less and the Li content and Ca content in the filler-material slab both to 0.30 mass % or less, the amounts of oxides of these metal elements that form on the surface of the brazing sheet decrease, and thereby degradation in brazeability can be avoided. From the viewpoint of further decreasing the amounts of oxides of these metal elements that form on the surface of the brazing sheet, the Mg content in the filler-material slab preferably is 1.5 mass % or less. From the same viewpoint, the Li content in the filler-material slab preferably is 0.10 mass % or less. In addition, the Ca content in the filler-material slab preferably is 0.10 mass % or less.

Bi: 0 Mass % or More and 1.0 Mass % or Less

The Al—Si series alloy that constitutes the filler-material slab may contain 1.0 mass % or less of Bi as an optional component. In the situation in which the filler-material slab contains greater than 0 mass % and 1.0 mass % or less of Bi, a brazing sheet comprising a filler material that contains Bi can be obtained. Bi acts to decrease the surface tension of the filler that arises during brazing, which improves brazeability in flux-free brazing. From the viewpoint of further improving brazeability in flux-free brazing, the Bi content in the filler-material slab preferably is 0.0040 mass % or more and more preferably is 0.010 mass % or more.

However, if the Bi content in the filler-material slab becomes excessive, it will become difficult to obtain the effect of improving brazeability commensurate with the Bi content. In addition, in this situation, there is a risk that the filler material after brazing will tend to discolor, resulting in defects in the external appearance. By setting the Bi content in the filler-material slab to 1.0 mass % or less and preferably to 0.40 mass % or less, brazeability can be further improved while avoiding these problems.

Na: 0 Mass % or More and 0.050 Mass % or Less, Sr: 0 Mass % or More and 0.050 Mass % or Less, Sb: 0 Mass % or More and 0.050 Mass % or Less The Al—Si series alloy that constitutes the filler-material slab may contain one or two or more elements from among 0.050 mass % or less of Na, 0.050 mass % or less of Sr, and 0.050 mass % or less of Sb as optional components. In the situation in which the filler-material slab contains one or two or more elements from among Na: greater than 0 mass % and 0.050 mass % or less, Sr: greater than 0 mass % and 0.050 mass % or less, and Sb: greater than 0 mass % and 0.050 mass % or less, a brazing sheet comprising a filler material that contains these elements can be obtained.

Na, Sr, and Sb in the filler material each act to increase the fineness of the Si particles in the filler material, which improves the fluidity of the molten filler. By preparing a brazing sheet using a filler-material slab that contains one or two or more elements from among Na: greater than 0 mass % and 0.050 mass % or less, Sr: greater than 0 mass % and 0.050 mass % or less, and Sb: greater than 0 mass % and 0.050 mass % or less, the fluidity of the molten filler increases, and thereby brazeability can be further improved.

Zn: 0 Mass % or More and 8.0 Mass % or Less, Sn: 0 Mass % or More and 0.10 Mass % or Less, in: 0 Mass % or More and 0.10 Mass % or Less The Al—Si series alloy that constitutes the filler-material slab may contain one or two or more elements from among 8.0 mass % or less of Zn, 0.10 mass % or less of Sn, and 0.10 mass % or less of In as optional components. In the situation in which the filler-material slab contains one or two or more elements from among Zn: greater than 0 mass % and 8.0 mass % or less, Sn: greater than 0 mass % and 0.10 mass % or less, and In: greater than 0 mass % and 0.10 mass % or less, a brazing sheet comprising a filler material that contains these elements can be obtained.

Zn, Sn, and In in the filler material each act to set the natural electrode potential of the filler material to a low potential. By setting the natural electrode potential of the filler material to a low potential, the filler material after brazing can be caused to function as a sacrificial anode of the aluminum product. However, if the Zn, Sn, or In content in the filler material becomes excessive, there is a risk that the natural electrode potential of the filler material will decrease excessively, and thereby the sacrificial corrosion-inhibiting effect will be diminished at an early stage. By preparing a brazing sheet using a filler-material slab that contains one or two or more elements from among Zn: greater than 0 mass % and 8.0 mass % or less, Sn: greater than 0 mass % and 0.10 mass % or less, and In: greater than 0 mass % and 0.10 mass % or less, the filler material can be caused to function as a sacrificial anode, and thereby the sacrificial corrosion-inhibiting effect due to the filler material can be maintained over a longer term.

Cu: 0 Mass % or More and 4.0 Mass % or Less

The Al—Si series alloy that constitutes the filler-material slab may contain 4.0 mass % or less of Cu as an optional component. In the situation in which the filler-material slab contains Cu: greater than 0 mass % and 4.0 mass % or less, a brazing sheet comprising a filler material that contains Cu can be obtained. Cu in the filler material acts to make the natural electrode potential of the filler material high potential and to lower the melting point.

By preparing a brazing sheet using a filler-material slab that contains Cu: greater than 0 mass % and 4.0 mass % or less, the natural electrode potential of the filler material is suitably raised, and thereby corrosion resistance of the filler material can be improved. In addition, by setting the Cu content in the filler-material slab to the above-mentioned specific range, fluidity of the filler increases, and thereby brazeability can be further improved.

Fe: 0 Mass % or More and 1.0 Mass % or Less

The Al—Si series alloy that constitutes the filler-material slab may contain 1.0 mass % or less of Fe as an optional component. In the situation in which the filler-material slab contains greater than 0 mass % and 1.0 mass % or less of Fe, a brazing sheet comprising a filler material that contains Fe can be obtained. Fe in the filler material in the brazing sheet acts to crystalize comparatively large Al—Fe-series intermetallic compounds in the filler material, which increases the fineness of the crystal grains of the filler material after brazing.

However, if the Fe content in the filler-material slab becomes excessive, then there is a risk that coarse Al—Fe-series intermetallic compounds will tend to form during casting, which will lead to a decrease in the ductility of the brazing sheet. By preparing a brazing sheet using a filler-material slab that contains Fe: greater than 0 mass % and 1.0 mass % or less, the functions and effects described above can be achieved while avoiding a decrease in ductility.

Mn: 0 Mass % or More and 1.0 Mass % or Less, Cr: 0 Mass % or More and 0.30 Mass % or Less, Ti: 0 Mass % or More and 0.30 Mass % or Less, Zr: 0 Mass % or More and 0.30 Mass % or Less The Al—Si series alloy that constitutes the filler-material slab may contain one or two or more elements from among 1.0 mass % or less of Mn, 0.30 mass % or less of Cr, 0.30 mass % or less of Ti, and 0.30 mass % or less of Zr as optional components. In the situation in which the filler-material slab contains one or two or more elements from among Mn: greater than 0 mass % and 1.0 mass % or less, Cr: greater than 0 mass % and 0.30 mass % or less, Ti: greater than 0 mass % and 0.30 mass % or less, and Zr: greater than 0 mass % and 0.30 mass % or less, a brazing sheet comprising a filler material that contains these elements can be obtained.

Mn, Cr, Ti, and Zr in the filler material act to precipitate fine intermetallic compounds in the filler material, thereby increasing the coarseness of the crystal grains of the filler material before brazing. By increasing the coarseness of the crystal grains of the filler material before brazing, the number of crystal-grain boundaries present in the filler material can be decreased. Thereby, it is possible to reduce the amounts of the metal elements, such as Mg, that pass through the crystal-grain boundaries of the filler material from the interiors of the core material, the filler material, or the like, and move to the surface of the brazing sheet. As a result, oxidation of the metal elements, such as Mg, at the filler-material surface is curtailed, and thereby degradation in brazeability can be avoided.

However, if the Mn, Cr, Ti, or Zr content in the filler-material slab becomes excessive, then there is a risk that coarse intermetallic compounds will tend to form during casting, which will lead to degradation in the ductility of the brazing sheet. By preparing a brazing sheet using a filler-material slab that contains one or two or more elements from among Mn: greater than 0 mass % and 1.0 mass % or less, Cr: greater than 0 mass % and 0.30 mass % or less, Ti: greater than 0 mass % and 0.30 mass % or less, and Zr: greater than 0 mass % and 0.30 mass % or less, brazeability can be improved while avoiding degradation in the ductility of the brazing sheet.

From the viewpoint of obtaining a good balance of the functions and effects described above, the aluminum material that constitutes the filler-material slab preferably has a chemical composition that contains Si: 4.0 mass % or more and 13.0 mass % or less, Fe: 0.05 mass % or more and 0.50 mass % or less, Mg: 0.10 mass % or more and 1.0 mass % or less, and Bi: 0.0040 mass % or more and 0.50 mass % or less, the remainder being Al and unavoidable impurities, and more preferably has a chemical composition that contains Si: 6.0 mass % or more and 12.0 mass % or less, Fe: 0.20 mass % or more and 0.40 mass % or less, Mg: 0.30 mass % or more and 1.2 mass % or less, and Bi: 0.050 mass % or more and 0.35 mass % or less, the remainder being Al and unavoidable impurities.

In addition, in the situation in which the aim is to obtain a brazing sheet in which the filler material does not contain Mg, the aluminum material that constitutes the filler-material slab preferably has a chemical composition that contains Si: 6.0 mass % or more and 12.0 mass % or less, Fe: 0.20 mass % or more and 0.40 mass % or less, and Bi: 0.050 mass % or more and 0.35 mass % or less, the remainder being Al and unavoidable impurities.

(Intermediate-Material Slab)

When the above-mentioned clad slab is to be prepared, by disposing the intermediate-material slab between the core-material slab and the filler-material slab, a brazing sheet can be obtained in which the intermediate material composed of the intermediate-material slab is provided between the core material and the filler material. The aluminum material that constitutes the intermediate-material slab has a chemical composition that differs from that of, for example, the core-material slab and the filler-material slab. More specifically, the aluminum material that constitutes the intermediate-material slab may have a chemical composition that is composed of Al and unavoidable impurities. In addition, the aluminum material that constitutes the intermediate-material slab may contain, in addition to Al and unavoidable impurities, one or two or more alloying elements selected from the group consisting of Fe, Si, Mg, Cu, Mn, Zn, Cr, Ti, Zr, Sn, and In.

In the situation in which the aim is to obtain a brazing sheet in which the intermediate material contains a metal element that oxidizes more readily than Al, the intermediate-material slab may be composed of an aluminum material that contains Mg: greater than 0 mass % and 6.0 mass % or less. It is noted that the chemical composition of the intermediate material is identical to the chemical composition of the intermediate-material slab.

Fe: 0 Mass % or More and 1.5 Mass % or Less

The aluminum material that constitutes the intermediate-material slab may contain 1.5 mass % or less of Fe as an optional component. In an embodiment of the present teachings in which the intermediate-material slab contains greater than 0 mass % and 1.5 mass % or less of Fe, a brazing sheet comprising an intermediate material that contains Fe can be obtained. In such an embodiment, the functions and effects due to Fe in the intermediate material are the same as the functions and effects due to Fe in the core material described above. That is, by preparing a brazing sheet using an intermediate-material slab that contains Fe: greater than 0 mass % and 1.5 mass % or less, the strength of the intermediate material can be further increased while avoiding degradation in corrosion resistance and a decrease in the ductility of the brazing sheet.

Si: 0 Mass % or More and 13.0 Mass % or Less

The aluminum material that constitutes the intermediate-material slab may contain 13.0 mass % or less of Si as an optional component. In the situation in which the intermediate-material slab contains greater than 0 mass % and 13.0 mass % or less of Si, a brazing sheet comprising an intermediate material that contains Si can be obtained. In the situation in which the amount of Si in the intermediate material is in the range of greater than 0 mass % and 1.5 mass % or less, the strength of the intermediate material can be further increased. In addition, in the situation in which the amount of Si in the intermediate material is greater than 1.5 mass % and 13.0 mass % or less, the intermediate material can be caused to melt during brazing heating. Thereby, the amount of filler supplied to the portion to be joined is further increased, thereby brazeability can be further improved. On the other hand, in the situation in which the amount of Si in the intermediate material is greater than 13.0 mass %, there is a risk that the amount of the core material melt will become excessive during brazing heating.

Mg: 0 Mass % or More and 6.0 Mass % or Less

The aluminum material that constitutes the intermediate-material slab may contain 6.0 mass % or less of Mg as an optional component. In the situation in which the intermediate-material slab contains greater than 0 mass % and 6.0 mass % or less of Mg, a brazing sheet comprising an intermediate material that contains Mg can be obtained. Mg in the intermediate material diffuses due to heating during brazing and moves into the filler material. Then, owing to the Mg that has moved into the filler material, together with the Mg in the filler material, breaking down the oxide films present on the surface of the brazing sheet and the surface of the opposing material, flux-free brazing can be performed.

From the viewpoint of further improving brazeability in flux-free brazing, the amount of Mg in the intermediate-material slab preferably is 0.40 mass % or more. In this situation, the amount of Mg that moves from the intermediate material into the filler material owing to heating during brazing can be made larger.

On the other hand, if the Mg content in the intermediate-material slab becomes excessive, then the amount of Mg that reaches the surface of the brazing sheet during brazing tends to become large. Then, if the Mg that reaches the surface of the brazing sheet oxidizes during brazing, there is a risk that it will lead to degradation in brazeability. By setting the Mg content in the intermediate-material slab to 6.0 mass % or less, the amount of Mg oxides formed during brazing further decreases and, in turn, degradation in brazeability can be avoided.

Cu: 0 Mass % or More and 2.0 Mass % or Less

The aluminum material that constitutes the intermediate-material slab may contain 2.0 mass % or less of Cu as an optional component. In the situation in which the intermediate-material slab contains greater than 0 mass % and 2.0 mass % or less of Cu, a brazing sheet comprising an intermediate material that contains Cu can be obtained. The functions and effects due to Cu in the intermediate material are the same as the functions and effects due to Cu in the core material described above. That is, by preparing a brazing sheet using an intermediate-material slab that contains Cu: greater than 0 mass % and 2.0 mass % or less, the strength and the corrosion resistance of the intermediate material can be further increased while avoiding the occurrence of intergranular corrosion and avoiding degradation in brazeability.

Mn: 0 Mass % or More and 2.0 Mass % or Less

The aluminum material that constitutes the intermediate-material slab may contain 2.0 mass % or less of Mn as an optional component. In the situation in which the intermediate-material slab contains greater than 0 mass % and 2.0 mass % or less of Mn, a brazing sheet comprising an intermediate material that contains Mn can be obtained. The functions and effects due to Mn in the intermediate material are the same as the functions and effects due to Mn in the core material described above. That is, by preparing a brazing sheet using an intermediate-material slab that contains Mn: greater than 0 mass % and 2.0 mass % or less, the strength and the corrosion resistance of the intermediate material can be further increased while avoiding degradation in the manufacturability of the brazing sheet.

Zn: 0 Mass % or More and 6.5 Mass % or Less, Sn: 0 Mass % or More and 0.10 Mass % or Less, and in: 0 Mass % or More and 0.10 Mass % or Less The aluminum material that constitutes the intermediate-material slab may contain one or two or more elements from among 6.5 mass % or less of Zn, 0.10 mass % or less of Sn, and 0.10 mass % or less of In as optional components. In the situation in which the intermediate-material slab contains one or two or more elements from among Zn: greater than 0 mass % and 6.5 mass % or less, Sn: greater than 0 mass % and 0.10 mass % or less, and In: greater than 0 mass % and 0.10 mass % or less, a brazing sheet comprising an intermediate material that contains these elements can be obtained.

The functions and effects due to Zn, Sn, and In in the intermediate material are the same as the functions and effects due to Zn, Sn, and In in the core material described above. That is, by preparing a brazing sheet using an intermediate-material slab that contains one or two or more elements from among Zn: greater than 0 mass % and 6.5 mass % or less, Sn: greater than 0 mass % and 0.10 mass % or less, and In: greater than 0 mass % and 0.10 mass % or less, the intermediate material can be caused to function as a sacrificial anode, and thereby the sacrificial corrosion-inhibiting effect due to the intermediate material can be maintained over a longer term.

Cr: 0 Mass % or More and 0.30 Mass % or Less, Zr: 0 Mass % or More and 0.30 Mass % or Less The aluminum material that constitutes the intermediate-material slab may contain one or two elements from among 0.30 mass % or less of Cr and 0.30 mass % or less of Zr as optional components. In the situation in which the intermediate-material slab contains one or two elements from among Cr: greater than 0 mass % and 0.30 mass % or less and Zr: greater than 0 mass % and 0.30 mass % or less, a brazing sheet comprising an intermediate material that contains these elements can be obtained.

The functions and effects due to Cr and Zr in the intermediate material are the same as the functions and effects due to Cr and Zr in the core material described above. That is, by preparing a brazing sheet using an intermediate-material slab that contains one or two elements from among Cr: greater than 0 mass % and 0.30 mass % or less and Zr: greater than 0 mass % and 0.30 mass % or less, the occurrence of erosion can be curtailed more effectively while avoiding degradation in the manufacturability of the brazing sheet.

15

Ti: 0 Mass % or More and 0.30 Mass % or Less

The aluminum material that constitutes the intermediate-material slab may contain 0.30 mass % or less of Ti as an optional component. In the situation in which the intermediate-material slab contains greater than 0 mass % and 0.30 mass % or less of Ti, a brazing sheet comprising an intermediate material that contains Ti can be obtained. The functions and effects due to Ti in the intermediate material are the same as the functions and effects due to Ti in the core material described above. That is, by preparing a brazing sheet using an intermediate-material slab that contains Ti: greater than 0 mass % and 0.30 mass % or less, the advancement of corrosion in the depth direction of the intermediate material can be curtailed more effectively while avoiding degradation in rollability and degradation in corrosion resistance.

From the viewpoint of obtaining a brazing sheet that can achieve a good balance of the functions and effects described above and that comprises an intermediate material that does not melt during brazing heating, the aluminum material that constitutes the intermediate-material slab preferably has a chemical composition that contains Fe: 0.05 mass % or more and 0.50 mass % or less, Si: 0.10 mass % or more and 0.50 mass % or less, Mg: 0.10 mass % or more and 3.0 mass % or less, Cu: 0.05 mass % or more and 0.50 mass % or less, Mn: 0.50 mass % or more and 1.5 mass % or less, and Ti: 0.01 mass % or more and 0.15 mass % or less, the remainder being Al and unavoidable impurities, and preferably has a chemical composition that contains Fe: 0.05 mass % or more and 0.30 mass % or less, Si: 0.15 mass % or more and 0.35 mass % or less, Mg: 0.50 mass % or more and 3.0 mass % or less, Cu: 0.10 mass % or more and 0.50 mass % or less, Mn: 1.0 mass % or more and 1.3 mass % or less, and Ti: 0.01 mass % or more and 0.15 mass % or less, the remainder being Al and unavoidable impurities.

In addition, in the situation in which the aim is to obtain a brazing sheet that comprises an intermediate material that is meltable during brazing heating, the aluminum material that constitutes the intermediate-material slab preferably has a chemical composition that contains Fe: 0.20 mass % or more and 0.40 mass % or less, Si: 6.0 mass % or more and 12.0 mass % or less, Mg: 0.50 mass % or more and 3.0 mass % or less, and Bi: 0 mass % or more and 0.35 mass % or less, the remainder being Al and unavoidable impurities.

(Skin-Material Slab)

When the above-mentioned clad slab is to be prepared, a brazing sheet can be obtained in which the filler material is provided on one surface of the core material and the skin material is provided on the other surface by disposing the filler-material slab on one surface of the core-material slab and disposing the skin-material slab on the other surface. The chemical composition of the aluminum material that constitutes the skin-material slab can be set as appropriate in accordance with the function to be imparted by the skin material. For example, the aluminum material that constitutes the skin-material slab may have a chemical composition composed of Al and unavoidable impurities. In this situation, the purity of the Al preferably is, for example, 99.9 mass % or more.

In addition, the aluminum material that constitutes the skin-material slab may contain, in addition to Al and unavoidable impurities, one or two or more alloying elements selected from the group consisting of Fe, Si, Mg, Cu, Mn, Zn, Cr, Ti, Zr, Sn, and In. It is noted that the chemical composition of the skin material is identical to the chemical composition of the skin-material slab.

16

Fe: 0 Mass % or More and 1.5 Mass % or Less

The aluminum material that constitutes the skin-material slab may contain 1.5 mass % or less of Fe as an optional component. In an embodiment of the present teachings in which the skin-material slab contains greater than 0 mass % and 1.5 mass % or less of Fe, a brazing sheet comprising a skin material that contains Fe can be obtained. In such an embodiment, the functions and effects due to Fe in the skin material are the same as the functions and effects due to Fe in the core material described above. That is, by preparing a brazing sheet using a skin-material slab that contains Fe: greater than 0 mass % and 1.5 mass % or less, the strength of the skin material can be further increased while avoiding degradation in corrosion resistance and a decrease in the ductility of the brazing sheet.

Si: 0 Mass % or More and 5.0 Mass % or Less

The aluminum material that constitutes the skin-material slab may contain 5.0 mass % or less of Si as an optional component. In the situation in which the skin-material slab contains greater than 0 mass % and 5.0 mass % or less of Si, a brazing sheet comprising a skin material that contains Si can be obtained. Si in the skin material acts to increase the strength of the skin material. However, if the Si content in the skin material becomes excessive, then there is a risk that the melting point of the skin material will decrease excessively, and thereby the skin material will tend to deform during brazing. By preparing a brazing sheet using a skin-material slab that contains Si: greater than 0 mass % and 5.0 mass % or less, strength can be increased while avoiding deformation of the skin material.

In addition, by setting the Si content in the skin-material slab to 1.5 mass % or more, the skin material can be put into a semimolten state during brazing. Thereby, brazing of the brazing sheet with an opposing material can be performed even on the skin-material-side surface of the brazing sheet.

Mg: 0 Mass % or More and 3.0 Mass % or Less

The aluminum material that constitutes the skin-material slab may contain 3.0 mass % or less of Mg as an optional component. In the situation in which the skin-material slab contains greater than 0 mass % and 3.0 mass % or less of Mg, a brazing sheet comprising a skin material that contains Mg can be obtained. Mg in the skin material acts to increase the strength of the skin material.

However, if the Mg content in the skin-material slab becomes excessive, then cracks will tend to occur in the skin material in the process of manufacturing the brazing sheet. By preparing a brazing sheet using the skin-material slab that contains Mg: greater than 0 mass % and 3.0 mass % or less, the strength of the skin material can be further increased while avoiding degradation in the manufacturability of the brazing sheet.

Cu: 0 Mass % or More and 1.0 Mass % or Less

The aluminum material that constitutes the skin-material slab may contain 1.0 mass % or less of Cu as an optional component. In the situation in which the skin-material slab contains greater than 0 mass % and 1.0 mass % or less of Cu, a brazing sheet comprising a skin material that contains Cu can be obtained. The functions and effects due to Cu in the skin material are the same as the functions and effects due to Cu in the core material described above. That is, by preparing a brazing sheet using a skin-material slab that contains Cu: greater than 0 mass % and 1.0 mass % or less, the strength and the corrosion resistance of the skin material can be further increased while avoiding the occurrence of intergranular corrosion and avoiding degradation in brazeability.

Mn: 0 Mass % or More and 2.0 Mass % or Less

The aluminum material that constitutes the skin-material slab may contain 2.0 mass % or less of Mn as an optional component. In the situation in which the skin-material slab contains greater than 0 mass % and 2.0 mass % or less of Mn, a brazing sheet comprising a skin material that contains Mn can be obtained. Mn in the skin material acts to increase the strength of the skin material.

However, if the Mn content in the skin-material slab becomes excessive, then cracks will tend to occur in the skin material in the process of manufacturing the brazing sheet. By preparing a brazing sheet using the skin-material slab that contains Mn: greater than 0 mass % and 2.0 mass % or less, the strength of the skin material can be further increased while avoiding degradation in the manufacturability of the brazing sheet.

Zn: 0 Mass % or More and 6.5 Mass % or Less, Sn: 0 Mass % or More and 0.10 Mass % or Less, and in: 0 Mass % or More and 0.10 Mass % or Less The aluminum material that constitutes the skin-material slab may contain one or two or more elements from among 6.5 mass % or less of Zn, 0.10 mass % or less of Sn, and 0.10 mass % or less of In as optional components. In the situation in which the skin-material slab contains one or two or more elements from among Zn: greater than 0 mass % and 6.5 mass % or less, Sn: greater than 0 mass % and 0.10 mass % or less, and In: greater than 0 mass % and 0.10 mass % or less, a brazing sheet comprising a skin material that contains these elements can be obtained.

The functions and effects due to Zn, Sn, and In in the skin material are the same as the functions and effects due to Zn, Sn, and In in the core material described above. That is, by preparing a brazing sheet using a skin-material slab that contains one or two or more elements from among Zn: greater than 0 mass % and 6.5 mass % or less, Sn: greater than 0 mass % and 0.10 mass % or less, and In: greater than 0 mass % and 0.10 mass % or less, the skin material can be caused to function as a sacrificial anode, and thereby the sacrificial corrosion-inhibiting effect due to the skin material can be maintained over a longer term.

Cr: 0 Mass % or More and 0.30 Mass % or Less, Ti: 0 Mass % or More and 0.30 Mass % or Less, Zr: 0 Mass % or More and 0.30 Mass % or Less The aluminum material that constitutes the skin-material slab may contain one or two or more elements from among 0.30 mass % or less of Cr, 0.30 mass % or less of Ti, and 0.30 mass % or less of Zr as optional components. In the situation in which the skin-material slab contains one or two elements from among Cr: greater than 0 mass % and 0.30 mass % or less, Ti: greater than 0 mass % and 0.30 mass % or less, and Zr: greater than 0 mass % and 0.30 mass % or less, a brazing sheet comprising a skin material that contains these elements can be obtained. Cr, Ti, and Zr in the skin material act to increase the strength of the skin material.

However, if the Cr, Ti, or Zr content in the skin-material slab becomes excessive, then there is a risk that coarse intermetallic compounds will tend to form during casting, which will lead to degradation in the ductility of the brazing sheet. By preparing a brazing sheet using a skin-material slab that contains one or two elements from among Cr: greater than 0 mass % and 0.30 mass % or less, Ti: greater than 0 mass % and 0.30 mass % or less, and Zr: greater than 0 mass % and 0.30 mass % or less, the strength of the skin material can be further improved while avoiding degradation in the ductility of the brazing sheet.

From the viewpoint of obtaining a good balance of the functions and effects described above, the aluminum material that constitutes the skin-material slab preferably has a chemical composition that contains Fe: 0.05 mass % or more and 0.50 mass % or less, Si: 0.10 mass % or more and 0.50 mass % or less, Mg: 0.10 mass % or more and 1.0 mass % or less, Cu: 0.05 mass % or more and 0.50 mass % or less, Mn: 0.50 mass % or more and 1.5 mass % or less, and Ti: 0.01 mass % or more and 0.15 mass % or less, the remainder being Al and unavoidable impurities.

In addition, in the situation in which the aim is to obtain a brazing sheet in which the skin material does not contain Mg, the aluminum material that constitutes the skin-material slab preferably has a chemical composition that contains Fe: 0.05 mass % or more and 0.50 mass % or less, Si: 0.05 mass % or more and 0.20 mass % or less, and Zn: 1.0 mass % or more and 4.0 mass % or less, the remainder being Al and unavoidable impurities.

<Hot-Rolling Process>

In the method of manufacturing the above-mentioned brazing sheet, after the layering process, a hot-rolling process is performed. In the hot-rolling process, hot rolling is performed on the clad slab obtained in the layering process. Thereby, a clad sheet can be obtained in which adjacent aluminum slabs are joined to each other. The rolling conditions in the hot-rolling process should be set as appropriate in accordance with the configuration of the clad slab, the configuration of the brazing sheet to be ultimately obtained, etc. In addition, after the hot-rolling process, a homogenization process may be performed by heating the clad sheet as needed.

<Cold-Rolling Process>

After the hot-rolling process, a cold-rolling process is performed in which one or more passes of cold rolling is performed on the obtained clad sheet. By cold rolling the clad sheet, the thickness of the clad sheet can be reduced to the desired thickness of the brazing sheet. The number of passes, the rolling conditions, and the like in the cold-rolling process should be set as appropriate in accordance with the composition of the clad sheet, the composition of the desired brazing sheet, etc. In addition, annealing may be performed by heating the clad sheet as needed prior to performing the cold rolling, during the cold rolling, or after the cold rolling has been performed.

<Etching Process>

When the hot rolling and the heat treatment described above are to be performed, oxide films, which have formed owing to the temperature of the clad sheet becoming high, are present on the surface of the clad sheet between passes of cold rolling and after completion of the cold rolling. To make these oxide films brittle, in the etching process, etching is performed on the surface of the clad sheet using an alkaline etching solution in which the concentration of NaOH is 0.05 mass % or more and 1.0 mass % or less.

More specifically, in the etching process, after the oxide films present on the surface of the filler material have been removed by bringing the above-mentioned specific alkaline etching solution into contact with the surface of the clad sheet, the alkaline etching solution is removed by rinsing the clad sheet. Subsequently, a rinsing solution, which is used in the rinsing of the clad sheet, is removed by drying the clad sheet. Water or the like is used as the rinsing solution.

In the etching process, the duration of time for which the alkaline etching solution is brought into contact with the clad sheet can be set as appropriate in the range of, for example, 5 seconds or more and 120 seconds or less. In addition, the temperature of the alkaline etching solution in the etching process can be set as appropriate in the range of, for example, 20° C. or higher and 80° C. or lower.

The etching process may be performed between cold rolling passes in the cold-rolling process or may be performed after the cold-rolling process has completed. In the situation in which the etching process is performed after the cold-rolling process has completed, etching may be performed in a coil-material state prior to the coil material being cut to the desired size, or etching may be performed after processing, such as cutting and pressing, has been performed to form the brazing sheet into the desired shape.

The alkaline etching solution used in the etching process is an aqueous solution in which the concentration of NaOH is 0.05 mass % or more and 1.0 mass % or less. By setting the NaOH concentration in the alkaline etching solution to the above-mentioned specific range, a brazing sheet having excellent brazeability can be easily obtained. The reason that brazeability in flux-free brazing can be improved by the above-mentioned specific alkaline etching solution is not necessarily clear at the present point in time, but it is considered that brazeability in flux-free brazing is improved owing to, for example, the following mechanism.

Sturdy oxide films, which are formed during hot rolling, etc., as described above, are present on the outermost surface of the filler material before the etching process is performed. In addition, the Al matrix and Si particles, which are dispersed in the Al matrix, are present in the interiors of the oxide films. In the situation in which the alkaline etching solution has been brought into contact with the surface of the filler material, the Al matrix can be selectively dissolved by the alkaline etching solution, which penetrates the interiors of the oxide films via defects in the oxide films.

When the dissolving of the Al matrix in the interiors of the oxide films advances, a gap is formed between the Al matrix and the oxide films. When this gap becomes sufficiently large, the oxide films detach from the Al matrix. As a result, it is assumed that the sturdy oxide films formed during hot rolling or the like can be removed from the surface of the filler material.

A newly created surface of the filler material is exposed to the surface of the filler material after the sturdy oxide films have been removed. In this state, when etching has ended and rinsing and drying of the clad sheet are performed, the newly created surface of the filler material is oxidized by the atmosphere. In so doing, because the oxide films formed on the surface of the filler material are more brittle than the oxide films formed during hot rolling or the like, the oxide films are easily broken down by metal elements, such as Mg, in the brazing sheet. Accordingly, it is assumed that, by performing etching using the above-mentioned specific alkaline etching solution, a brazing sheet that excels in brazeability in flux-free brazing can be obtained.

In the situation in which the NaOH concentration of the alkaline etching solution is below the above-mentioned specific range, removal of the sturdy oxide films in the etching process tends to become insufficient. As a result, there is a risk that it will lead to degradation in brazeability.

In addition, even in the situation in which the NaOH concentration of the alkaline etching solution is above the above-mentioned specific range, there is a risk that it will lead to degradation in brazeability. For example, the following is conceivable as one reason for this. When the NaOH concentration of the alkaline etching solution becomes high, dissolving of the Al matrix in the etching process advances rapidly. However, the Si particles in the filler material are not dissolved by the alkaline etching solution. Consequently, when the dissolving of the Al matrix advances rapidly, unevenness in the surface of the filler material tends to form for reasons such as: the Si particles in the Al matrix are exposed; the Si particles fall off as the Al matrix around the Si particles dissolves; or the like.

Accordingly, if the etching by the alkaline etching solution, the NaOH concentration of which is high, advances excessively, then it is assumed that the unevenness of the surface of the filler material will become large, and thereby the true surface area of the filler-material surface, i.e., the surface area of the filler material that takes the unevenness of the surface into consideration, will become large. Then, if the filler material, in which the unevenness is large, is exposed to the atmosphere, then it is considered that the true surface area of the oxide films formed on the surface of the filler material will also become large. Consequently, in the situation in which flux-free brazing is performed using such a brazing sheet, it is assumed that there is a risk that the breaking down of the oxide films by metal elements, such as Mg, will tend to become insufficient, which will lead to degradation in brazeability.

From the viewpoint of further improving brazeability of the brazing sheet, the NaOH concentration of the alkaline etching solution preferably is 0.05 mass % or more and 0.50 mass % or less and more preferably is 0.05 mass % or more and 0.30 mass % or less.

In addition to NaOH, KOH may be dissolved in the alkaline etching solution. The KOH concentration in the alkaline etching solution preferably is 0.10 mass % or more and 1.0 mass % or less. In this situation, brazeability of the ultimately obtained brazing sheet can be further improved. Furthermore, by setting the KOH concentration in the alkaline etching solution to the above-mentioned specific range, deterioration of the alkaline etching solution is curtailed, and thereby the lifespan of the alkaline etching solution can be further lengthened.

From the viewpoint of further increasing such functions and effects, the KOH concentration of the alkaline etching solution preferably is 0.10 mass % or more and 0.70 mass % or less and more preferably is 0.10 mass % or more and 0.50 mass % or less. From the same viewpoint, preferably, the NaOH concentration of the alkaline etching solution is 0.05 mass % or more and 0.50 mass % or less and the KOH concentration is 0.10 mass % or more and 0.70 mass % or less; and, more preferably, the NaOH concentration of the alkaline etching solution is 0.05 mass % or more and 0.30 mass % or less and the KOH concentration is 0.10 mass % or more and 0.50 mass % or less.

The alkaline etching solution preferably further contains a surfactant. In this situation, the time needed for etching further shortens, the occurrence of nonuniformity in the reaction is curtailed, and the entire clad sheet can be etched evenly.

<Smut-Removal Process>

The method of manufacturing the above-mentioned brazing sheet may have a smut-removal process that, after the above-mentioned etching process, removes smut, which forms on the surface of the above-mentioned clad sheet in the above-mentioned etching process, using a desmutting solution, which contains at least one from among sulfuric acid and nitric acid. The desmutting solution used in the smut-removal process is, specifically, an aqueous solution that contains at least one from among sulfuric acid and nitric acid.

In the smut-removal process, after smut adhered to the surface of the filler material has been removed by bringing the desmutting solution into contact with the surface of the clad sheet, the desmutting solution is removed by rinsing the clad sheet. Subsequently, the rinsing solution that was used in the rinsing of the clad sheet is removed by drying the clad sheet. Water or the like is used as the rinsing solution.

In the etching process, smut, which includes the alloying elements contained in the filler material, sometimes adheres to the surface of the filler material. If smut is adhered to the surface of the filler material, then there is a risk that the filler will tend not to wet during brazing, which will lead to degradation in brazeability.

On the other hand, smut easily dissolves in acids such as sulfuric acid and nitric acid. For this reason, by performing the smut-removal process after the etching process has been performed, the smut adhered to the surface of the filler material is removed, and thereby brazeability of the brazing sheet can be further improved.

In the smut-removal process, the duration of time for which the desmutting solution is brought into contact with the clad sheet can be set as appropriate in the range of, for example, 2 seconds or more and 60 seconds or less.

The brazing sheet obtained by the above-mentioned manufacturing method can be used in flux-free brazing, that is, in brazing that is performed in an inert-gas atmosphere without the application of flux. For example, nitrogen, argon, helium, or the like can be used as the inert gas.

In flux-free brazing, if the oxygen concentration and the dew point in the inert-gas atmosphere are excessively high, then there is a risk that it will lead to degradation in brazeability. However, with regard to the above-mentioned brazing sheet, because the oxide films present on the surface of the filler material are made brittle in advance as described above, degradation in brazeability can be avoided even at a relatively high oxygen concentration and a relatively high dew point. With regard to the above-mentioned brazing sheet, for example, flux-free brazing can be performed in an inert-gas atmosphere in which the oxygen concentration is 100 vol. ppm or less and the dew point is –30° C. or lower.

Although the heating conditions in flux-free brazing are not particularly limited, if the time needed from the start of when heating when brazing is being performed until the filler material melts is excessively long, then oxidation of the surface of the filler material will progress, and therefore there is a risk that it will lead to degradation in brazeability. From the viewpoint of avoiding such problems, brazing is preferably performed under heating conditions in which the time needed from when the temperature of the brazing sheet reaches 300° C. until the temperature of the brazing sheet reaches the solidus temperature of the filler material is 40 min or less.

WORKING EXAMPLES

Working examples of the method of manufacturing the brazing sheet are explained below. It is noted that the aspects of the method of manufacturing the brazing sheet according to the present invention are not limited to the aspects of the working examples described below, and the constitutions can be modified as appropriate within a range that does not depart from the gist thereof.

Working Example 1

In the present example, a method of manufacturing single-sided brazing sheets, in which the filler material is layered on one surface of the core material, will be explained. First, core-material slabs were prepared that were composed of an aluminum material that contained Si: 0.30 mass %, Fe: 0.10 mass %, Cu: 0.12 mass %, Mn: 1.2 mass %, Mg: 0.60 mass %, and Ti: 0.10 mass %, the remainder being Al and unavoidable impurities. In addition, separately from the core-material slabs, filler-material slabs were prepared that were composed of an Al—Si series alloy having a chemical composition that contained Si: 11.8 mass %, Fe: 0.30 mass %, Mg: 0.60 mass %, and Bi: 0.30 mass %, the remainder being Al and unavoidable impurities. Two-layer-structure clad slabs were prepared (layering process) by overlaying a filler-material slab on one surface of a core-material slab prepared in this manner.

Next, hot rolling was performed on the clad slabs, and clad sheets, in which a filler material was layered on one surface of a core material, were prepared (hot-rolling process). After one or more passes of cold rolling was performed on these clad sheets, the thickness of the clad sheets was set to 0.8 mm (cold-rolling process). Thereafter, the clad sheets were subjected to a final annealing. It is noted that the clad percentage of the filler materials in the clad sheets after cold rolling, i.e., the ratio of the thickness of the filler materials to the thickness of the clad sheets, was set to 8%.

After the cold rolling, rolling oil was removed from the surfaces of the clad sheets by degreasing and rinsing the clad sheets. Next, the surfaces of the clad sheets were etched by bringing alkaline etching solutions, in which the NaOH concentrations were the values shown in Table 1, into contact with the clad sheets. The temperatures and the processing times of the alkaline etching solutions that were brought into contact with the clad sheets are as shown in Table 1. After the etching was completed, the alkaline etching solutions were removed by rinsing the clad sheets, after which the clad sheets were dried (etching process). Based on the above, the brazing sheets shown in Table 1 (Test Material A1 to Test Material A5) could be obtained.

In addition, with regard to Test Material A6 to Test Material A8 shown in Table 1, smut that adhered to the surfaces of the clad sheets was removed by bringing the clad sheets, after the etching process was performed, into contact with desmutting solutions having the compositions shown in Table 1. The processing times for which the desmutting solutions were brought into contact with the clad sheets are as shown in Table 1. After the removal of smut was completed, the desmutting solutions were removed by rinsing the clad sheets, after which the clad sheets were dried (smut-removal process). As a result of the above, the brazing sheets shown in Table 1 (Test Material A6 to Test Material A8) could be obtained.

Test Material A9 shown in Table 1 is a test material for comparison with Test Material A1 to Test Material A8. Other than the fact that the etching process was not performed after degreasing and rinsing was performed, the method of manufacturing Test Material A9 was the same as the method of manufacturing Test Material A1 to Test Material A5.

The brazeability of Test Material A1 to Test Material A9 could be evaluated using a gap-filling test. In the gap-filling test, first, a test specimen 1 shown in the Figure was assembled. As shown in the Figure, the test specimen 1 comprises: a horizontal sheet 2, which is composed of Test Material A1 to Test Material A9; and a perpendicular sheet 3, which is composed of a JIS A3003 alloy and has a sheet thickness of 1.0 mm. The horizontal sheet 2 is disposed horizontally such that a filler material 21 is oriented upward and a core material 22 is oriented downward. The perpendicular sheet 3 is disposed such that it is orthogonal to the horizontal sheet 2. In addition, one end 31 of the perpendicular sheet 3 in a longitudinal direction makes contact with the filler material 21 of the horizontal sheet 2. It is noted that the width of the horizontal sheet 2 is 25 mm and the length is 60 mm. In addition, the width of the perpendicular sheet 3 is 25 mm and the length is 55 mm.

A spacer 4 was interposed between other end 32 of the perpendicular sheet 3 in the longitudinal direction and the horizontal sheet 2. Thereby, a gap S, which gradually widened from the one end 31 of the perpendicular sheet 3 toward the spacer 4 side, was formed between the horizontal sheet 2 and the perpendicular sheet 3. The spacer 4 was, specifically, a round wire that was made of stainless steel having a diameter of 1.6 mm and was disposed at a location at which it was separated by 55 mm in the horizontal direction from the location (i.e., the one end 31 of the perpendicular sheet 3) at which the perpendicular sheet 3 is in contact with the horizontal sheet 2.

The brazing of the test specimen was performed using a nitrogen-gas furnace. Specifically, first, the atmosphere in the furnace was set to a nitrogen-gas atmosphere having an oxygen concentration of 10 vol. ppm or less, and the test specimen was disposed in the furnace in the state in which the in-furnace temperature was 100° C. or lower. After leaving the test specimen in the furnace for 10 min, brazing heating was started. Brazing heating was performed by raising the temperature of the test specimen to a temperature of 600° C. and then maintaining the temperature of 600° C. for 3 min. After brazing heating was completed, the test specimen was cooled in the furnace until the temperature fell to a certain extent, after which the test specimen was removed from the furnace.

In the gap-filling test, it was possible to evaluate brazeability based on length L and the shape (refer to the Figure) of a fillet F formed after brazing. In the "Brazeability" column in Table 1, symbol "A" is recorded when length L of the fillet F was greater than 40 mm, symbol "B" was recorded when length L of the fillet F was 30 mm or more and 40 mm or less, symbol "C" was recorded when length L of the fillet F was less than 30 mm and fluctuation in the size of the fillet was small, and symbol "D" was recorded when length L of the fillet F was less than 30 mm and fluctuation in the size of the fillet was large.

possible to make length L of the fillet longer than in Test Material A4 and Test Material A5, in which the NaOH concentration was outside of the above-mentioned specific range, and longer than in Test Material A9, in which the etching process was not performed.

Working Example 2

In the present example, a method of manufacturing a two-sided brazing sheet, in which the filler material is layered on both surfaces of the core material, will be explained. In the present example, first, a core-material slab and two filler-material slabs were prepared. The chemical compositions of the core-material slab and the filler-material slabs were the same as those in Working Example 1. Next, three-layer-structure clad slabs were prepared (layering process) by overlaying filler-material slabs on both surfaces of the core-material slab.

Next, hot rolling was performed on the clad slabs, and thereby clad sheets, in which the filler materials were layered on both surfaces of the core material, were prepared (hot-rolling process). After one or more passes of cold rolling was performed on these clad sheets, the thickness of the clad sheets was set to 1.0 mm (cold-rolling process). Thereafter, the clad sheets were subjected to a final annealing. It is noted that the clad percentage of the filler materials in the clad sheets after cold rolling, i.e., the ratio of the thickness of the filler materials to the thickness of the clad sheets, was 5%, respectively.

Thereafter, Test Materials B1-B9 shown in Table 2 could be obtained by sequentially performing the degreasing and rinsing, the etching process, and the smut-removal process in the same manner as in Working Example 1. It is noted that the compositions, the temperatures, and the processing times of the alkaline etching solutions that were brought into contact with the clad sheets in the etching process of the present example are as shown in Table 2. In addition, the compositions of the desmutting solutions that were brought into contact with the clad sheets and the processing times for

TABLE 1

| Test Material Symbol | Etching Process | | | Smut-Removal Process | | Brazeability |
| | Etching Solution | Temp. (° C.) | Processing Time (s) | Desmutting Solution | Processing Time (s) | |
| --- | --- | --- | --- | --- | --- | --- |
| A1 | 0.1 mass % of NaOH | 25 | 10 | None | | B |
| A2 | 0.5 mass % of NaOH | 25 | 10 | None | | B |
| A3 | 1.0 mass % of NaOH | 25 | 10 | None | | B |
| A4 | 3.0 mass % of NaOH | 25 | 10 | None | | C |
| A5 | 6.0 mass % of NaOH | 25 | 10 | None | | C |
| A6 | 0.1 mass % of NaOH | 60 | 10 | 60% nitric acid | 30 | B |
| A7 | 0.5 mass % of NaOH | 60 | 10 | 60% nitric acid | 30 | B |
| A8 | 1.0 mass % of NaOH | 60 | 10 | 60% nitric acid | 30 | B |
| A9 | None | | | None | | D |

As shown in Table 1, in the etching process for Test Material A1 to Test Material A3 and Test Material A6 to Test Material A8, alkaline etching solutions were used in which the NaOH concentration was within the above-mentioned specific range. Consequently, in these test materials, it was which the desmutting solutions were brought into contact in the smut-removal process of the present example are as shown in Table 2.

It was possible to evaluate brazeability for Test Material B1 to Test Material B9 using the gap-filling test the same as in Working Example 1. The evaluation results of brazeability of the test specimens that used the test materials are as shown in Table 2.

TABLE 2

| Test Material Symbol | Etching Process | | | Smut-Removal Process | | Brazeability |
| | Etching Solution | Temp. (° C.) | Processing Time (s) | Desmutting Solution | Processing Time (s) | |
| --- | --- | --- | --- | --- | --- | --- |
| B1 | 0.1 mass % of NaOH + 0.2 mass % of KOH | 60 | 10 | 0.7% sulfuric acid | 3 | A |
| B2 | 0.1 mass % of NaOH + 0.2 mass % of KOH | 60 | 30 | 0.7% sulfuric acid | 10 | A |
| B3 | 0.1 mass % of NaOH + 0.2 mass % of KOH | 60 | 60 | 0.7% sulfuric acid | 20 | A |
| B4 | 0.15 mass % of NaOH + 0.3 mass % of KOH | 60 | 10 | 0.7% sulfuric acid | 3 | A |
| B5 | 0.15 mass % of NaOH + 0.3 mass % of KOH | 60 | 30 | 0.7% sulfuric acid | 10 | A |
| B6 | 0.15 mass % of NaOH + 0.3 mass % of KOH | 60 | 60 | 0.7% sulfuric acid | 20 | A |
| B7 | 0.2 mass % of NaOH + 0.4 mass % of KOH | 60 | 10 | 0.7% sulfuric acid | 3 | A |
| B8 | 0.2 mass % of NaOH + 0.4 mass % of KOH | 60 | 30 | 0.7% sulfuric acid | 10 | A |
| B9 | 0.2 mass % of NaOH + 0.4 mass % of KOH | 60 | 60 | 0.7% sulfuric acid | 20 | A |

As shown in Table 2, in the etching process for Test Material B1 to Test Material B9, alkaline etching solutions were used in which the NaOH concentrations were within the above-mentioned specific range. Consequently, these test materials had excellent brazeability. In addition, from a comparison of Test Material B1 to Test Material B9 with Test Material A6 to Test Material A8 shown in Table 1, it can be understood that brazeability of brazing sheets could be further improved by using an aqueous solution in which both NaOH and KOH were dissolved as the alkaline etching solution.

The invention claimed is:

1. A method of manufacturing a brazing sheet for performing brazing of an aluminum material in an inert-gas atmosphere without using flux, comprising:

a layering process wherein a plurality of aluminum slabs are layered, the aluminum slabs including a core-material slab composed of an aluminum material and a filler-material slab composed of an Al—Si series alloy and disposed on at least one surface of the core-material slab, and wherein a clad slab is prepared in which at least one aluminum slab, from among the plurality of the aluminum slabs, disposed in the span from the core-material slab to the filler-material slab inclusive contains a metal element that oxidizes more readily than Al;

a hot-rolling process wherein hot rolling is performed on the clad slab and a clad sheet is prepared that comprises a core material, which is composed of the core-material slab, and a filler material, which is composed of the filler-material slab and disposed on at least one surface of the core material;

a cold-rolling process wherein one or more passes of cold rolling is performed on the clad sheet; and an etching process wherein, between passes of cold rolling in the cold-rolling process or after completion of the cold-rolling process, a surface of the clad sheet is etched using an alkaline etching solution in which the NaOH concentration is 0.05 mass % or more and 1.0 mass % or less;

wherein:

in the hot-rolling process, the filler material is joined to at least one surface of the core material; and in the etching process, at least an outermost surface of the filler material of the clad sheet is etched.

2. The method of manufacturing a brazing sheet according to claim 1, wherein KOH is additionally dissolved in the alkaline etching solution, and the KOH concentration in the alkaline etching solution is 0.10 mass % or more and 1.0 mass % or less.

3. The method of manufacturing a brazing sheet according to claim 1, further comprising a smut-removal process wherein, after the etching process, smut that has formed on the surface of the clad sheet in the etching process is removed using a desmutting solution that contains at least one from among sulfuric acid and nitric acid.

4. The method of manufacturing a brazing sheet according to claim 1, wherein the Al—Si series alloy that constitutes the filler-material slab has a chemical composition that contains Si: 4.0 mass % or more and 13.0 mass % or less, Mg: 0 mass % or more and 3.0 mass % or less, Li: 0 mass % or more and 0.30 mass % or less, Ca: 0 mass % or more and 0.30 mass % or less, Bi: 0 mass % or more and 1.0 mass % or less, Na: 0 mass % or more and 0.050 mass % or less, Sr: 0 mass % or more and 0.050 mass % or less, Sb: 0 mass % or more and 0.050 mass % or less, Zn: 0 mass % or more and 8.0 mass % or less, Cu: 0 mass % or more and 4.0 mass % or less, Fe: 0 mass % or more and 1.0 mass % or less, Mn: 0 mass % or more and 1.0 mass % or less, Cr: 0 mass % or more and 0.30 mass % or less, Ti: 0 mass % or more and 0.30 mass % or less, Zr: 0 mass % or more and 0.30 mass % or less, Sn: 0 mass % or more and 0.10 mass % or less, and In: 0 mass % or more and 0.10 mass % or less, the remainder being Al and unavoidable impurities.

5. The method of manufacturing a brazing sheet according to claim 1, wherein the aluminum material that constitutes the core-material slab has a chemical composition that contains Fe: 0 mass % or more and 1.5 mass % or less, Si: 0 mass % or more and 1.5 mass % or less, Mg: 0 mass % or more and 3.0 mass % or less, Cu: 0 mass % or more and 2.0 mass % or less, Mn: 0 mass % or more and 2.0 mass % or less, Zn: 0 mass % or more and 6.5 mass % or less, Cr: 0 mass % or more and 0.30 mass % or less, Ti: 0 mass % or more and 0.30 mass % or less, Zr: 0 mass % or more and 0.30 mass % or less, Sn: 0 mass % or more and 0.10 mass % or less, and In: 0 mass % or more and 0.10 mass % or less, the remainder being Al and unavoidable impurities.

6. The method of manufacturing a brazing sheet according to claim 1, wherein the clad slab comprises the core-material slab, the filler-material slab, which is disposed on one surface of the core-material slab, and a skin-material slab, which is composed of an aluminum material and is disposed on the other surface of the core-material slab, and the aluminum material that constitutes the skin-material slab has a chemical composition that contains Fe: 0 mass % or more and 1.5 mass % or less, Si: 0 mass % or more and 5.0 mass % or less, Mg: 0 mass % or more and 3.0 mass % or less, Cu: 0 mass % or more and 1.0 mass % or less, Mn: 0 mass % or more and 2.0 mass % or less, Zn: 0 mass % or more and 6.5 mass % or less, Cr: 0 mass % or more and 0.30 mass % or less, Ti: 0 mass % or more and 0.30 mass % or less, Zr: 0 mass % or more and 0.30 mass % or less, Sn: 0 mass % or more and 0.10 mass % or less, and In: 0 mass % or more and 0.10 mass % or less, the remainder being Al and unavoidable impurities.

7. The method of manufacturing a brazing sheet according to claim 2, further comprising, after the etching process, removing smut that has formed on the surface of the clad sheet in the etching process using a desmutting solution that contains at least one acid selected from the group consisting of sulfuric acid and nitric acid.

8. The method of manufacturing a brazing sheet according to claim 7, wherein the Al—Si series alloy that constitutes the filler-material slab has a chemical composition that contains Si: 4.0 mass % or more and 13.0 mass % or less, Mg: 0 mass % or more and 3.0 mass % or less, Li: 0 mass % or more and 0.30 mass % or less, Ca: 0 mass % or more and 0.30 mass % or less, Bi: 0 mass % or more and 1.0 mass % or less, Na: 0 mass % or more and 0.050 mass % or less, Sr: 0 mass % or more and 0.050 mass % or less, Sb: 0 mass % or more and 0.050 mass % or less, Zn: 0 mass % or more and 8.0 mass % or less, Cu: 0 mass % or more and 4.0 mass % or less, Fe: 0 mass % or more and 1.0 mass % or less, Mn: 0 mass % or more and 1.0 mass % or less, Cr: 0 mass % or more and 0.30 mass % or less, Ti: 0 mass % or more and 0.30 mass % or less, Zr: 0 mass % or more and 0.30 mass % or less, Sn: 0 mass % or more and 0.10 mass % or less, and In: 0 mass % or more and 0.10 mass % or less, the remainder being Al and unavoidable impurities.

9. The method of manufacturing a brazing sheet according to claim 8, wherein the aluminum material that constitutes the core-material slab has a chemical composition that contains Fe: 0 mass % or more and 1.5 mass % or less, Si: 0 mass % or more and 1.5 mass % or less, Mg: 0 mass % or more and 3.0 mass % or less, Cu: 0 mass % or more and 2.0 mass % or less, Mn: 0 mass % or more and 2.0 mass % or less, Zn: 0 mass % or more and 6.5 mass % or less, Cr: 0 mass % or more and 0.30 mass % or less, Ti: 0 mass % or more and 0.30 mass % or less, Zr: 0 mass % or more and 0.30 mass % or less, Sn: 0 mass % or more and 0.10 mass % or less, and In: 0 mass % or more and 0.10 mass % or less, the remainder being Al and unavoidable impurities.

10. The method of manufacturing a brazing sheet according to claim 9, wherein the clad slab comprises the core-material slab, the filler-material slab, which is disposed on one surface of the core-material slab, and a skin-material slab, which is composed of an aluminum material and is disposed on the other surface of the core-material slab, and the aluminum material that constitutes the skin-material slab has a chemical composition that contains Fe: 0 mass % or more and 1.5 mass % or less, Si: 0 mass % or more and 5.0 mass % or less, Mg: 0 mass % or more and 3.0 mass % or less, Cu: 0 mass % or more and 1.0 mass % or less, Mn: 0 mass % or more and 2.0 mass % or less, Zn: 0 mass % or more and 6.5 mass % or less, Cr: 0 mass % or more and 0.30 mass % or less, Ti: 0 mass % or more and 0.30 mass % or less, Zr: 0 mass % or more and 0.30 mass % or less, Sn: 0 mass % or more and 0.10 mass % or less, and In: 0 mass % or more and 0.10 mass % or less, the remainder being Al and unavoidable impurities.

11. The method of manufacturing a brazing sheet according to claim 10, wherein the NaOH concentration in the alkaline etching solution is 0.05-0.30 mass % and the KOH concentration in the alkaline etching solution is 0.10-0.50 mass %.

12. A method of manufacturing a brazing sheet for performing brazing of an aluminum material in an inert-gas atmosphere without using flux, comprising:

preparing a clad slab by layering at least a core-material slab composed of an aluminum material and a filler-material slab composed of an Al—Si series alloy, wherein at least one aluminum slab in the clad slab disposed in a range from the core-material slab to the filler-material slab inclusive of the core-material slab and the filler-material slab contains a metal element that oxidizes more readily than Al;

preparing a clad sheet by hot rolling the clad slab such that the clad sheet comprises a core material, which is composed of the core-material slab, and a filler material, which is composed of the filler-material slab;

performing one or more passes of cold rolling on the clad sheet; and between passes of the cold rolling or after completion of the cold rolling, etching at least one surface of the clad sheet using an alkaline etching solution having a sodium hydroxide concentration of 0.05-1.0 mass %;

wherein:

in the hot-rolling process, the filler material is joined to at least one surface of the core material; and in the etching process, at least an outermost surface of the filler material of the clad sheet is etched.

13. The method according to claim 12, wherein the alkaline etching solution has a potassium hydroxide concentration of 0.10-1.0 mass %.

14. The method according to claim 12, further comprising, after the etching process, removing smut that has formed on the at least one surface of the clad sheet in the etching process using a desmutting solution that contains at least one acid selected from the group consisting of sulfuric acid and nitric acid.

15. The method according to claim 12, wherein the Al—Si series alloy that constitutes the filler-material slab has a chemical composition that contains:

Si: 4.0 mass % or more and 13.0 mass % or less,

Mg: 0 mass % or more and 3.0 mass % or less,

Li: 0 mass % or more and 0.30 mass % or less,

Ca: 0 mass % or more and 0.30 mass % or less,

Bi: 0 mass % or more and 1.0 mass % or less,

Na: 0 mass % or more and 0.050 mass % or less,

Sr: 0 mass % or more and 0.050 mass % or less,

Sb: 0 mass % or more and 0.050 mass % or less,

Zn: 0 mass % or more and 8.0 mass % or less,

Cu: 0 mass % or more and 4.0 mass % or less,

Fe: 0 mass % or more and 1.0 mass % or less,

Mn: 0 mass % or more and 1.0 mass % or less,

Cr: 0 mass % or more and 0.30 mass % or less,

Ti: 0 mass % or more and 0.30 mass % or less,

Zr: 0 mass % or more and 0.30 mass % or less,

Sn: 0 mass % or more and 0.10 mass % or less, and

In: 0 mass % or more and 0.10 mass % or less, the remainder being Al and unavoidable impurities.

16. The method according to claim 12, wherein the aluminum material that constitutes the core-material slab has a chemical composition that contains:

Fe: 0 mass % or more and 1.5 mass % or less,

Si: 0 mass % or more and 1.5 mass % or less,

Mg: 0 mass % or more and 3.0 mass % or less,

Cu: 0 mass % or more and 2.0 mass % or less,

Mn: 0 mass % or more and 2.0 mass % or less,

Zn: 0 mass % or more and 6.5 mass % or less,

Cr: 0 mass % or more and 0.30 mass % or less,

Ti: 0 mass % or more and 0.30 mass % or less,

Zr: 0 mass % or more and 0.30 mass % or less,

Sn: 0 mass % or more and 0.10 mass % or less, and

In: 0 mass % or more and 0.10 mass % or less, the remainder being Al and unavoidable impurities.

17. The method according to claim 12, wherein:

the filler-material slab is disposed on a first surface of the core-material slab, a skin-material slab is disposed on a second surface of the core-material slab that is opposite of the first surface, and the skin-material slab is composed of an aluminum material having a chemical composition that contains:

Fe: 0 mass % or more and 1.5 mass % or less,

Si: 0 mass % or more and 5.0 mass % or less,

Mg: 0 mass % or more and 3.0 mass % or less,

Cu: 0 mass % or more and 1.0 mass % or less,

Mn: 0 mass % or more and 2.0 mass % or less,

Zn: 0 mass % or more and 6.5 mass % or less,

Cr: 0 mass % or more and 0.30 mass % or less,

Ti: 0 mass % or more and 0.30 mass % or less,

Zr: 0 mass % or more and 0.30 mass % or less,

Sn: 0 mass % or more and 0.10 mass % or less, and

In: 0 mass % or more and 0.10 mass % or less, the remainder being Al and unavoidable impurities.

18. The method according to claim 17, wherein the aluminum material that constitutes the skin-material slab has a chemical composition that contains:

Fe: 0.05 mass % or more and 0.50 mass % or less,

Si: 0.05 mass % or more and 0.20 mass % or less, and

Zn: 1.0 mass % or more and 4.0 mass % or less, the remainder being Al and unavoidable impurities.

19. The method according to claim 12, wherein the sodium hydroxide concentration in the alkaline etching solution is 0.05-0.30 mass % and the potassium hydroxide concentration in the alkaline etching solution is 0.10-0.50 mass %.

20. The method of manufacturing a brazing sheet according to claim 1, wherein:

KOH is additionally dissolved in the alkaline etching solution, and the KOH concentration in the alkaline etching solution is 0.10 mass % or more and 1.0 mass % or less; and the NaOH concentration is 0.05 mass % or more and 0.50 mass % or less.

21. The method of manufacturing a brazing sheet according to claim 12, wherein:

KOH is additionally dissolved in the alkaline etching solution, and the KOH concentration in the alkaline etching solution is 0.10 mass % or more and 0.5 mass % or less; and the NaOH concentration is 0.05 mass % or more and 0.30 mass % or less.

* * * * *